July 16, 1968 R. A. MEADOWS ET AL 3,393,328

THERMAL COUPLING ELEMENTS

Filed Sept. 4, 1964 4 Sheets-Sheet 1

Walter T. Matzen, Jr.
Robert A. Meadows
INVENTORS

Walter T. Matzen, Jr.
Robert A. Meadows
INVENTORS

Walter T. Matzen, Jr.
Robert A. Meadows
INVENTORS

INVENTORS
Walter T. Matzen, Jr.,
Robert A. Meadows

United States Patent Office 3,393,328
Patented July 16, 1968

3,393,328
THERMAL COUPLING ELEMENTS

Robert A. Meadows and Walter T. Matzen, Jr., Richardson, Tex., assignors to Texas Instruments Incorporated, Dallas, Tex., a corporation of Delaware Filed Sept. 4, 1964, Ser. No. 394,578
3 Claims. (Cl. 307—310)

ABSTRACT OF THE DISCLOSURE

Disclosed is a thermocoupling element upon which two components are in heat conducting relationship with each other, one component being a heat source and the other component being sensitive to heat generated by said source. A heat sink is thermally coupled to the components and provide an element having utility for controlling the operating characteristics of a semiconductor device at very low frequencies.

This invention relates to electrical circuits of the type embodied in integrated semiconductor devices, and more particularly to the utilization of thermal coupling in such devices to provide operating characteristics at very low frequencies.

The operation of integrated electronic circuits in the low frequency range is limited by fact that conventional low-frequency circuit elements require large physical size, the size aspect being contrary to the object of extreme miniaturization. Another factor which has influenced miniature integrated circuit construction is the effect of inherent thermal interaction between the closely spaced electrical components in a unitary structure. Circuit stability can be influenced by unwanted interelement coupling resulting from heat transport within the substrate and temperature sensitivity of the elements. Both of these difficulties can be overcome by utilizing low frequency thermal coupling between circuit elements in an integrated oscillator, filter or the like, eliminating the need for large capacitors or inductors and employing advantageously, rather than to disadvantage, the heat flow between components in the device.

In the copending application of Lee L. Evans, Serial No. 222,235, filed September 7, 1962 and now abandoned, and assigned to the assignee of this application, thermal coupling is used in a high gain amplifier to stabilize the DC operating point or in a circuit for stabilizing the operating temperature of an integrated structure. In the Evans' application, DC or zero frequency heat flow is used in a negative feedback sense between two components such as transistors in successive stages in a circuit. There is a finite time delay associated with heat flow in structures of this type, and so as set forth in the copending application of Robert A. Meadows, Serial No. 230,946, filed October 16, 1962, now Patent Number 3,258,606, and assigned to the assignee of this application, the thermal coupling may be utilized in a frequency selective sense, recognizing that positive feedback occurs under certain conditions so that with appropriate gain and feedback ratio an oscillator may be obtained. The present invention is directed to improved thermal coupling elements, low frequency oscillators, frequency selective amplifiers and the like, and is based upon improvements evolving from the principles set forth in the above-identified Evans and Meadows applications.

The electrical circuit analog of thermal conduction is current flow through a transmission line made up of series resistance and distributed shunt capacitance. Heat flow and temperature correspond to current flow and voltage, respectively. The time delay between a change in heating effect at a heat source and its detection as a change in temperature at a heat sensor can also be considered in terms of the sensor detecting a change in phase shift and attenuation of a thermal wave propagating outward from the heat source. This is identical to considering an electrical transmission line from either the time delay or phase shift point of view. If thermal coupling occurs between succeeding stages in an amplifier circuit, when considered in terms of phase shift, oscillation should result when the phase of the thermal wave is shifted by 180 degrees, provided the electrical gain of the amplifier overcomes thermal losses. Phase shift and attenuation of thermal waves are determined by the geometry of the conduction path and the physical constants of the conduction medium. These constants are density, thermal conductivity, and specific heat. Since the phase shift and frequency are related, the frequency of oscillation is also determined by the geometry and thermal characteristics of the feedback path.

As set forth in detail below, the analogy between electrical charge flow (current) in a complex resistor-capacitor network and heat flow in a solid can be useful in predicting thermal performance, the analysis showing the desirability of certain features of the invention. In the case of heat flow which is essentially one dimensional, such as through a long thin bar, the analogy provides a particularly useful analysis of the behavior of certain structures. The electrical equivalent of the long thin bar is a series resistance shunted by distributed capacitance, which when connected as a feedback path around an amplifier provides the essential components of a phase shift oscillator. By relating the physical constants of the solid to the corresponding electrical components, the conventional tests for feedback amplifier stability can be applied to determine the criteria for oscillation. In addition, the voltage-current-position-time relations commonly used for electrical transmission lines can be used to determine corresponding temperature-heat flow-position-time relations for the thermal circuit.

An important characteristic of an electrical transmission line is its characteristic impedance, which is the current-voltage ratio at any point on a line of infinite length. An analogous "thermal characteristic impedance" for a long thin solid bar, a thermal transmission line, appears to be equally important. By the analogy, this is the ratio of the temperature to the heat flow. The thermal characteristic impedance is useful in determining the effects of thermal terminations. A perfect heat sink attached to the end of a bar corresponds to an electrical short-circuit termination, while a perfect insulator is an open circuit.

In contrast to electrical circuits where truly alternating voltage or current sources are realized, a variable heat source which conveniently can be provided in a thermal circuit is not strictly an alternating source, i.e., it can only add heat, not remove heat. Typically, a transistor is used as a variable heat source since it is a power dissipating device which can be modulated. Because heat can only be added to the thermal circuit by the transistor heat source (no cooling effect by the transistor is possible), there will necessarily be two components, one time varying and the other constant. Due to this feature, the temperature of a thermally isolated structure using thermal effects would continuously increase because of the steady-state component until limited by heat loss due to radiation or convection. Thus the final temperature probably would exceed the operation range of the semiconductor components used, even at a very low level of power dissipation. The temperature rise must therefore be limited by appropriate heat sinking in a practical thermal circuit, but as will be seen the heat sink must be placed to minimize shunting of the useful signal or temperature swing.

The analysis of the thermal oscillator or coupling element of this invention will show some degree of dependence upon the steady-state temperature of the element exhibited in the operating frequency of the device. In order to stabilize the frequency, the temperature of the substrate may be advantageously maintained constant by a combined low frequency coupling element and temperature stabilizing circuit, both using thermal coupling.

It is the object of this invention to provide improved low-frequency coupling elements which utilize thermal propagation and which may be embodied in integrated semiconductor circuits such as oscillators and the like. Other objects are to provide thermal coupling elements which have optimum transfer characteristics, which are relatively insensitive to changes in temperature due to their own operation or to the ambient, which exhibit minimum steady-state temperature rise commensurate with maximum thermal signal transmission, which permit selection of operating frequency, and additional features as will appear below.

The novel features believed characteristic of the invention are set forth in the appended claims. The invention itself, however, along with further objects and advantages thereof, may best be understood from the following detailed description of illustrative embodiments, when read in conjunction with the accompanying drawings, wherein:

FIGURE 4(*b*) is a schematic diagram of the electrical circuit equivalent of the thermal bar of FIGURE 4(*a*);

FIGURE 5(*b*) is a schematic diagram of the electrical circuit equivalent of the thermal device of FIGURE 5(*a*);

FIGURE 8(*b*) is a schematic diagram of a circuit employing the device of FIGURE 8(*a*).

Figures 1, 2:
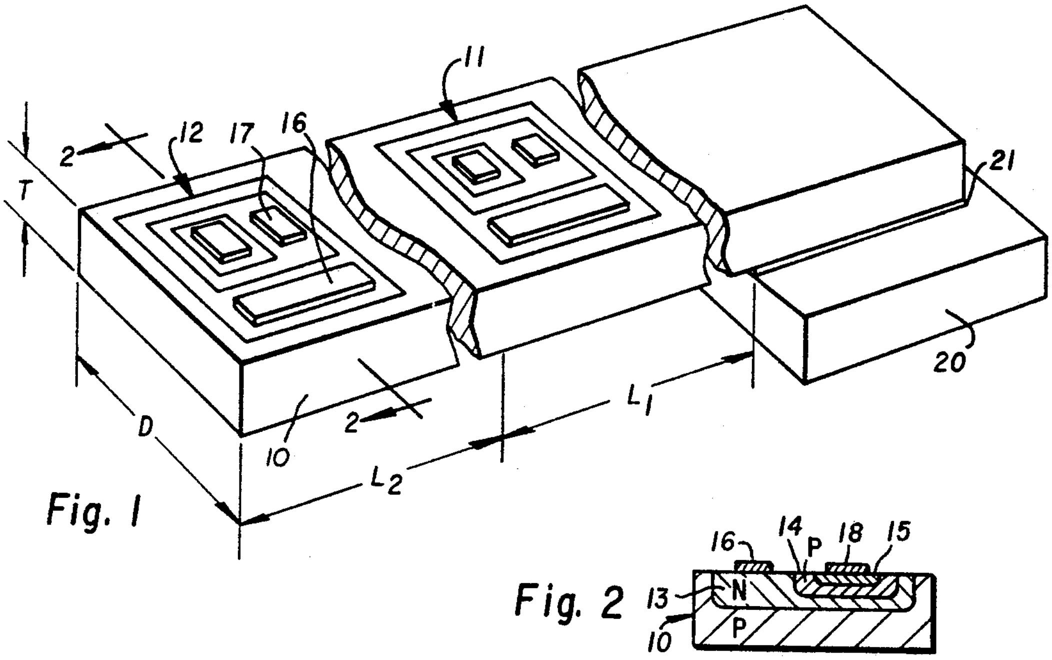
FIGURE 1 is a pictorial representation of a thermal coupling device incorporating features of this invention.
FIGURE 2 is a sectional view of a portion of the device of FIGURE 1 taken along the line 2—2.

With reference to FIGURE 1, there is illustrated a thermal coupling element in accordance with this invention. The element comprises an elongated semiconductor bar 10 having a heater transistor 11 and a sensor transistor 12 in intimate heat-conducting relationship therewith. In one embodiment, the bar 10 is composed of single crystal silicon and the transistors 11 and 12 are formed within the single crystal material by diffusion. Alternatively, the bar 10 could be comprised of high resistance polycrystalline silicon or other semiconductor material, and the transistors 11 and 12 defined in monocrystalline regions adjacent the surface of the bar but separated therefrom by a dielectric such as silicon oxide. The significant point is that the heater and sensor transistors be thermally coupled to one another through a medium of known transfer characteristics, but electrically isolated from one another. In the embodiment wherein monocrystalline silicon is used, the bar 10 may be P-type with the collector, base and emitter regions 13, 14 and 15, respectively, of the transistor 12 being formed by successive diffusions of opposite conductivity as illustrated in FIGURE 2. Metal is selectively applied to the bar to provide collector, base and emitter contacts 16, 17 and 18, respectively. An oxide coating, not shown, would ordinarily cover the silicon bar except where contacts are made. The transistor 11 is of the same form as the transistor 12.

One end of the bar 10, opposite the transistor 12, is secured in good heat-conducting relationship to a heat sink 20 by a solder element 21. The function of this heat sink is to maintain the steady-state temperature of the unit generally constant, and the placement of the heat sink will affect the transfer characteristics of the thermal coupling element as will appear hereinafter.

Figure 3:
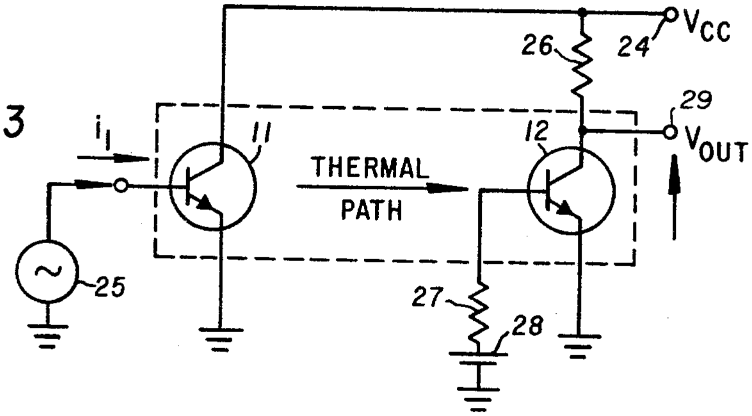
FIGURE 3 is a schematic diagram of an electrical circuit using the thermal coupling element of FIGURE 1.

The transistors 11 and 12 are connected into an electrical circuit as shown in schematic form in FIGURE 3. The heater transistor functions without other circuit components, with its collector contact being connected directly to a negative supply 24, the emitter contact is connected directly or through a low resistance to ground, and the base contact connected to an input source 25. The sensor transistor 12 has its collector 16 connected through a load resistor 26 to the supply 24, the emitter contact 18 is grounded, and the base contact 17 is maintained essentially at a constant DC voltage with respect to ground by a voltage divider between $V_{cc}$ and ground. The Thevenin equivalent circuit of this divider network is represented in FIGURE 3 by the battery 28 and the resistor 27. Low values of resistance are used such that resistor 27 has a low value of resistance. An output terminal 29 for the thermal coupling element is connected to the collector of the sensor transistor 12. It should be noted that the entire circuit of FIGURE 3 may be part of an integrated semiconductor structure, the resistors 26 and 27 as well as the transistors being formed in or on the semiconductor bar 10.

The electrical characteristics of the thermal coupling element described above will now be examined. A change in current $i_1$ into the base of the heater transistor 11 produces a variation in power dissipation at the collector-base junction, causing a swing in the junction temperature. The temperature fluctuation propagates through the bar to the sensor transistor 12, varying the temperature of the base-emitter junction thereof and thus producing a variation in the collector-emitter current in this transistor and a change in the output current $i_{out}$. For sine wave input and small signal conditions, all of these quantities will vary sinusoidally. The electrical-thermal transfer characteristics of the heater and sensor transistors, determined by circuit parameters and inherent device properties, are substantially constant over the frequency range which is of interest here. In this context, the response of the thermal transfer element as a function of frequency, being defined as $F(\omega)$, is determined by the thermal impedance $\Psi$ of the heater transistor and the propagation factor $\phi$ of the temperature wave between the heater and sensor transistors 11 and 12. This relationship may be expressed $$F(\omega)=\frac{i_{out}}{i_1}=A_1\Psi(\omega)\phi(\omega) \quad (1)$$

where as stated above $i_{out}$ and $i_1$ are the sinusoidal output and input current, respectively. Also, $A_1$ is a constant determined by circuit and device constants. Defining $P_H$ as the sinusoidal input power to the heater, and $T_H$ and $T_S$ as the sinusoidal temperature swings at the heater and sensor transistors, respectively, the factors $\Psi$ and $\phi$ may be stated $$\Psi(\omega)=T_H/P_H \quad (2)$$

$$\phi(\omega)=T_S/T_H \quad (3)$$

Figure 4A:
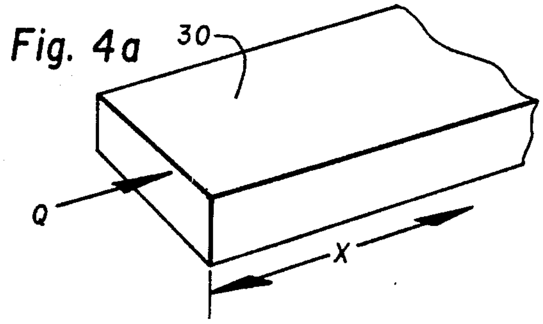
FIGURE 4(*a*) is a pictorial view of a thermal coupling bar considered in the analysis given of the device of FIGURE 1.
Figure 4B:
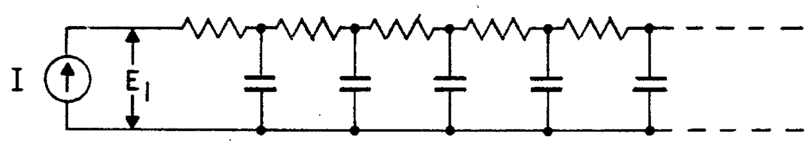

Now the heat flow into the bar, the heater temperature, and the sensor temperature may be related through the classical heat-flow equation with appropriate boundary conditions. A simple configuration which may be used in establishing these relationships is a semi-infinite bar 30 as seen in FIGURE 4(*a*) with a heat source P located at one end of the bar. Assume heat is applied uniformly across the end surface of the bar at $X=0$ and that top, bottom, and sides are perfectly insulated. Under these conditions heat flow is one-dimensional, and the temperature T is governed by the following relation $$\frac{\partial T}{\partial t}=-\frac{1}{\rho c}\frac{\partial P_x}{\partial x} \quad (4)$$

where $t$ is time, $\rho$ is density and $c$ is specific heat. $P_x$ is the power P at a point $x$, given by $$P_x=-k_s\partial T/\partial x$$

The solution to Equation (4) is identical in form to that of an RC transmission line as seen in FIGURE 4($b$), comparing heat flow P to current $i$ and temperature T to voltage $v$. The thermal bar 30 is driven by a constant heat flow, P (i.e., P is independent of bar temperature), corresponding to a constant current drive, I, to the transmission line of FIGURE 4($b$). This establishes an input temperature $$T_1=P\Psi_o \quad (5)$$

just as the input voltage $E_1$ of the transmission line is established $$E_1=IZ_o \quad (6)$$

$T_1$, the input temperature, corresponds to $E_1$, the input voltage, while the characteristic thermal impedance $\Psi_o$ of the bar corresponds to the characteristic impedance $Z_o$ of the line. By extending the analogy of the bar and the transmission line to include the application of heat to the bar in a sinusoidal fashion, a traveling wave of temperature is established by the thermal input of the form $$T(x)=T_1\epsilon^{-\alpha x}\epsilon^{j(\omega t-\beta x)} \quad (7)$$

just as $$E(x)=E_1\epsilon^{-\alpha x}\epsilon^{j(\omega t-\beta x)} \quad (8)$$

where $\alpha$ and $\beta$ are constants determined by the physical characteristics of the bar or corresponding electrical parameters of the transmission line.

Since heat can only be added to the bar by a transistor heat source, no cooling effect being possible, a DC component of power must be introduced along with the AC component. Thus a thermal path to a heat sink must be provided to limit the DC temperature rise of the bar of FIGURE 4($a$). It is for this reason that the path $l_1$ to the heat sink 20 appears in the embodiment of FIGURE 1, which is designed to provide efficient AC coupling between the heater transistor 11 and the sensor transistor 12 with good heat dissipation through the heat sink 20 for the steady-state power component. The device of FIGURE 1 may be simplified using certain assumptions to the configuration of FIGURE 5($a$). First, the heater and sensor transistors 11 and 12 will be assumed to apply or be responsive to heat uniformly in a plane perpendicular to the length of the bar 10, and the sensor will be assumed to be at the end of the bar. Likewise, the heat sink 20 will be assumed to remove heat from the bar uniformly across a plane perpendicular to the length of the bar. In view of typical dimensions of the unit, these assumptions are seen to be valid. For example, the thickness of T of the bar 10 may be 10 mils, the width D 25 mils, the length $l_1$ from the heater transistor 11 to the heat sink 60 mils, and the length $l_2$ from the heater to the sensor transistor 60 mils. The thickness T, and the area occupied by a transistor on the face of the bar, are both small in relation to the length $l_1$ and $l_2$. The analogous transmission line corresponding to the thermal element of FIGURE 5($a$) is shown in FIGURE 5($b$), where the heat sink 20 appears as a short circuit on the right hand end, the sensor as an open circuit on the left hand end, the heat source 11 as a current source in the center, and the thermal coupling paths as distributed resistance-capacitance elements.

Figure 5A:
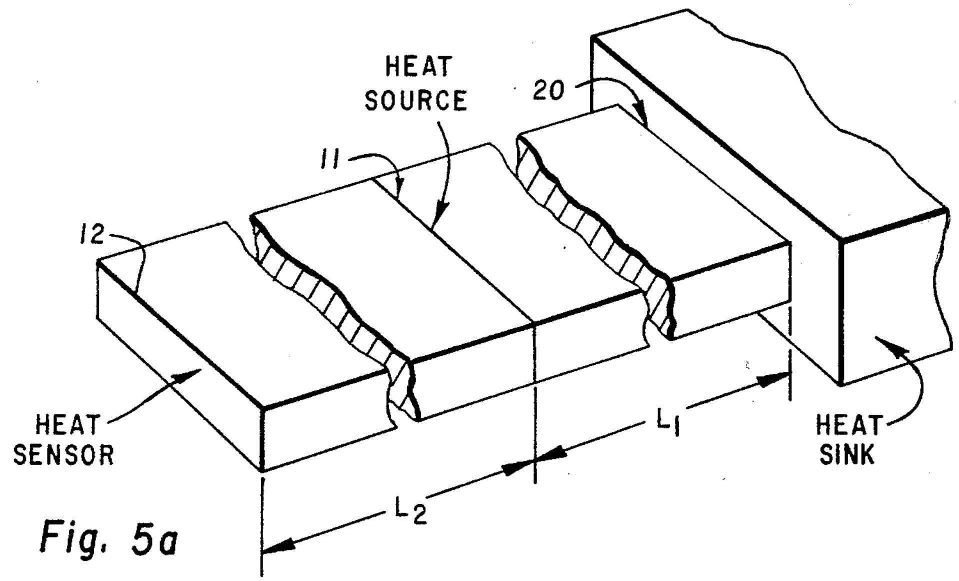
FIGURE 5(*a*) is a simplified version of the structure of FIGURE 1 considered in the analysis thereof.
Figure 5B:
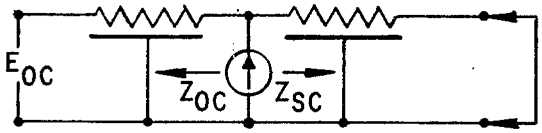

The asymptotic values for the frequency characteristic of the thermal transfer element of FIGURE 1 may be calculated using the transmission line analogy of FIGURE 5($b$). At low frequencies the transfer function approaches the constant value $$F(o)=A_1\frac{T_S(o)}{P_H(o)}=A_1\Psi(o) \quad (9)$$

where it will be noted that $\Psi(o)$ is the DC thermal impedance from the heat source 11 to the heat sink 20. The expression for thermal input impedance at higher frequencies is similar in form to that of the analogous transmission line of FIGURE 5($b$). The thermal impedance presented to the source is the parallel combination of the input impedances of a short circuit line and an open circuit line. However, at high frequencies where the spacings $l_1$ and $l_2$ exceed a quarter wavelength for the thermally propagated wave, each thermal input impedance corresponding to the electrical input impedances $Z_{oc}$ and $Z_{sc}$ is approximately equal to the characteristic impedance, $\Psi_o$, and $$\Psi=\frac{\Psi o}{2}=\frac{A_2}{\sqrt{\omega}}\underline{/-45^\circ} \quad (10)$$

The propagation factor, corresponding to that of an open circuit line, is $$\phi(\omega)=\frac{T_S}{T_H}=\frac{1}{\cos h(\alpha+j\beta)l_2} \quad (11)$$

Hence, at high frequencies, $F(\omega)$ is given by $$F(\omega)=\frac{A_3}{\sqrt{\omega}}\epsilon^{-\alpha l_2}\epsilon^{-j\left(\beta l_2+\frac{\pi}{4}\right)} \quad (12)$$

where $A_3$, $\alpha$ and $\beta$ may be calculated in terms of the physical constants of the material and circuit constants. Consideration of Equation (12) reveals that a 45° phase shift results at the heat source 11 even if $l_2=0$. The remaining phase shift is contributed by the length $l_2$.

For the dimensions given above for the device of FIGURE 1, calculation of the transfer function shows the characteristics of a low pass filter, as may be expected from transmission line analogy. The frequency at which 180° phase shift occurs is about 46 c.p.s.

Figure 6:
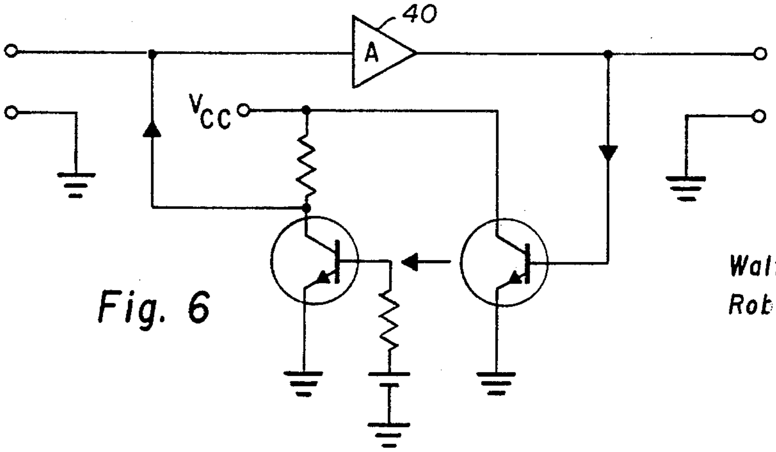
FIGURE 6 is a schematic diagram of the device of FIGURE 1 connected in a feedback circuit to provide an oscillator or amplifier.
Figure 7:
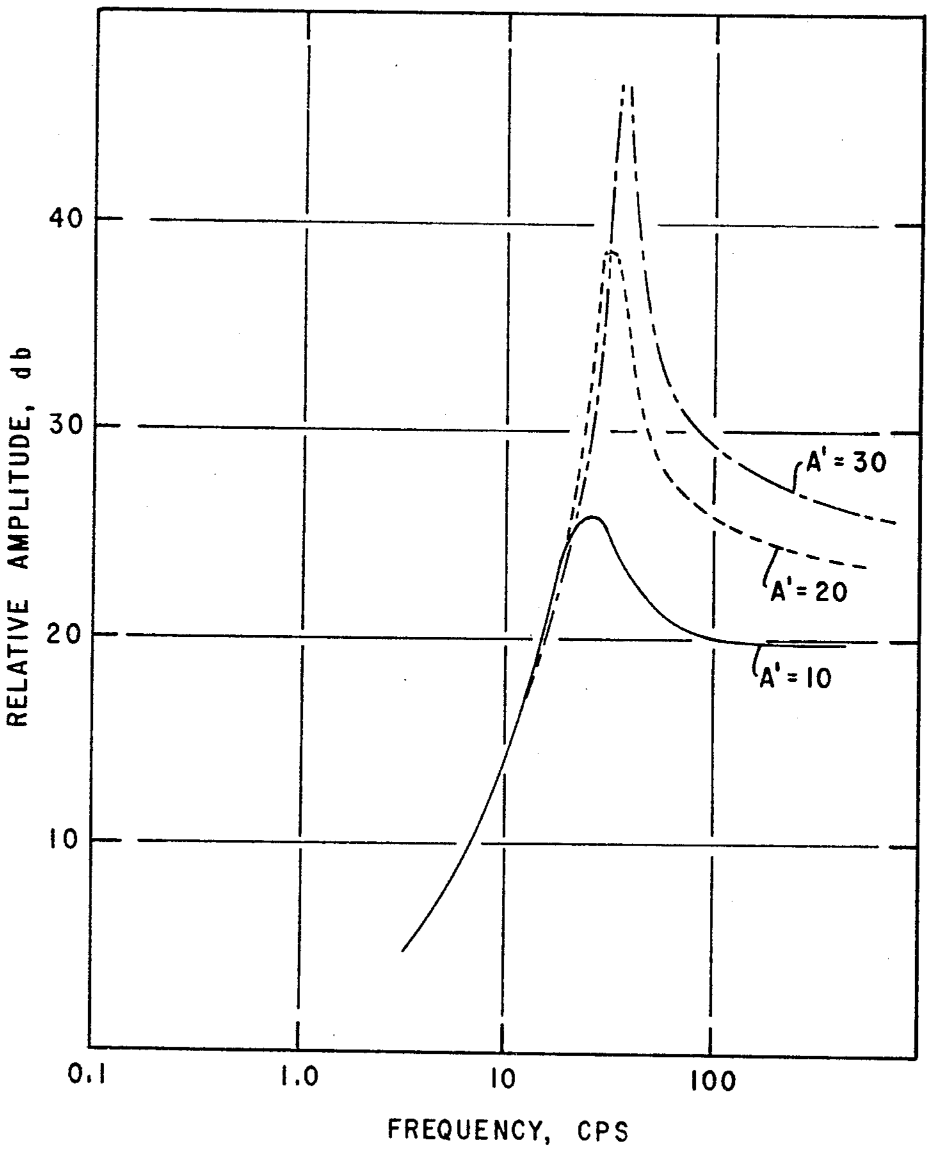
FIGURE 7 is a graph showing the response of the system of FIGURE 6.

The coupling element of FIGURES 1 and 3 may be connected as a feedback path for an amplifier 40 as in FIGURE 6 to provide a low frequency oscillator or frequency selective amplifier. The closed loop gain of this arrangement, A′, is defined by the conventional feedback relationship $$A'=\frac{-A}{1+FA} \quad (13)$$

where A is the open loop current gain of the amplifier 40 and F is the transfer characteristic of the feedback path. The transfer function A′ is plotted in FIGURE 7 for several values of A. For low frequencies, where the distance $l_2$ between heater and sensor transistors is small in comparison to a wavelength, feedback is negative and the amplifier gain is low. The peak in the response curve occurs at the frequency for which the thermal element has a phase shift of 180° and the system becomes regenerative. Feedback is decreased at high frequencies, since attenuation increases, and the response approaches the gain A of the open loop amplifier 40.

An oscillator is provided by the configuration of FIGURE 6 if, at the frequency for which F has a phase lag of 180°, the closed loop gain exceeds unity, or $$|FA|\geqq 1.0$$

where the transfer function F is given by Equation (12) above, phase shift being accounted for by the thermal impedance H and the propagation ratio, $\phi$. The total phase shift of 180° required for oscillation will occur for a propagation delay of 135° corresponding to the relationship $$\beta l_2=\frac{3\pi}{4} \quad (14)$$

where $$\beta=\sqrt{\frac{\omega\rho C}{2k}} \qquad (15)$$

in which $k$ is the thermal conductivity of the bar 10, C is its specific heat, and $\rho$ is its density. For silicon at room temperature, 300° K., the thermal conductivity $k$ is 0.21 cal./sec. cm. ° C., the specific heat C is 0.181 cal./gm. ° C., and the density $\rho$ is 2.33 gm./cm.$^3$. Using these constants in the structure described above with the dimensions given, the frequency for 180° phase shift at 300° K. may be calculated using Equations (14) and (15) combined as $$f_{180^\circ}=\frac{k}{\pi\rho C}\left[\frac{3\pi}{4l_2}\right]^2 \qquad (16)$$

resulting in a value of 40 c.p.s. which agrees quite well with measured values.

A significant feature of this invention is the temperature stabilization of the substrate or bar 10 provided by the feedback arrangement of FIGURE 6. Under DC conditions, i.e., the nonvarying component of temperature, there is no phase shift in the thermal coupling from the transistor 11 to the transistor 12. Thus the amplifier 40 has negative feedback for DC, and this tends to hold the substrate at a constant temperature regardless of ambient temperature. Considering the circuit for FIGURE 6, it will be noted that an increase of ambient temperature would cause the temperature of the substrate on bar 10 to increase, but this would cause the temperature of the transistor 12 to increase and thus increase its collector current and decrease its collector voltage. The decrease in the output voltage of the sensor transistor 12 would be reflected as a decrease in the DC output of the amplifier 40, which would lower the DC base drive of the heater transistor 11, decreasing its heating effect upon the bar 10 and thus tending to decrease its temperature. Hence, the substrate tends to stabilize at essentially a constant temperature, and it can be shown that the effect of ambient temperature on substrate temperature is decreased as the gain of the amplifier 40 is increased.

For a given thermal path length $l_2$ the frequency for a specified phase shift is determined by the phase constant $\beta$ which is related to the physical constants of the material as shown by Equation (15) above. One of the constants, the thermal conductivity $k$, is inversely proportional to absolute temperature. Thus the frequency for constant phase shift varies inversely with absolute temperature, and so for a constant frequency of oscillation the temperature of the thermal path must be held constant. As set forth above, the osciallator of FIGURE 6 performs the function of stabilizing the bar temperature.

The temperature of the substrate may be adjusted by varying the base-emitter voltage of the transistor 12 by the battery 28, which varies the collector currents of the transistors 11 and 12 and the power input to the bar 10 in the circuit of FIGURE 6. In view of the above, it is thus seen that this adjustment can be used to vary the frequency of oscillation over a small range.

Another feature of interest in the circuit of FIGURE 6 is the stabilization of operating point produced by the operation of this thermal oscillator. In the case of a class C feedback oscillator with conventional electrical feed back, the amplifier is designed to have an inherent gain capability greater than necessary for oscillation. Oscillations build up in magnitude until limiting occurs, reducing the gain to the value necessary to maintain oscillation. The thermal feedback oscillator described above operates on this same principle. As the oscillations and to build up in magnitude, the peak value of current through the transistor 11 would increase and so would the average value of this current, thus tending to increase the temperature of the bar. However, this increase in steady-state temperature would increase the collector current of the transistor 12, decrease its collector voltage, and therefore lower the average value of collector current of the transistor 11 by means of the path though the amplifier. The DC thermal feedback thus tends to hold the collector current of the transistor 12 at a constant value. This would require a decrease in the conduction angle, which decreases the fundamental component of thermal power, and, therefore, the effective gain of the amplifier. The conduction angle stabilizes at a point which produces just sufficient gain for oscillation.

A class A stabilized oscillator is provided by using a linear amplifier 40 with a gain which decreases with the output amplifier.

The device of FIGURE 1, without the amplifier of FIGURE 6, provides a low-pass filter with an extremely low cutoff frequency, in the area of 1.0 c.p.s. in the embodiment set forth above. The frequency response characteristic of the low pass filter may be tailored by varying $l_1$ and $l_2$.

The thermal oscillator of FIGURE 6 also provides band-pass filter characteristics. The gain of the amplifier 40 is reduced below the value necessary for oscillation. Under this condition, the frequency response between input and output will be of the form of one of the curves of FIGURE 7. At low frequencies the phase shift approaches zero, feedback is negative and the response is quite small. At about 45 c.p.s., feedback is positive and the network is regenerative, giving a large increase in response. The magnitude of the feedback decreases with frequency and is negligible at high frequencies where the gain approaches the open loop gain.

The frequency range of the thermal phase shift element is dependent upon the physical dimensions which can be achieved. The frequency at which 180° phase shift occurs is given from above as $f=0.883/l_2^2$ in c.p.s. where $l_2$ is in cm. In the above embodiment, $l_2\approx60$ mil and so $f\approx45$ c.p.s. A maximum practical size might be perhaps 0.5 cm. corresponding to a minimum frequency of oscillation of 3.5 c.p.s. The minimum spacing between source and sensor would be limited by the physical size of the transistors, and would be on the order of 2.0 mils corresponding to a maximum frequency of oscillation of about 35 kc. Lower frequency of operation is attained by using two or more thermal phase shift elements in cascade to provide the required 180° phase shift at a specified frequency with shorter thermal paths.

It can be shown that a configuration other than that of FIGURE 1 can provide 180° phase shift with less attenuation, thus requiring less overall gain for oscillation. A semiconductor discs with a heat sensor at its center and a heat source all around its periphery is one example, and another is a bar having a sensor at the center and a heat source at each end.

An incresed signal for a given geometry and frequency is provided by using several diodes, located adjacent each other and connected in series, for the heat sensor in place of a single transistor. These series-connected diodes are connected in series with a constant current source and across the base and emitter of a transistor for producing the electrical signal corresponding to the thermal signal.

Figure 8A:
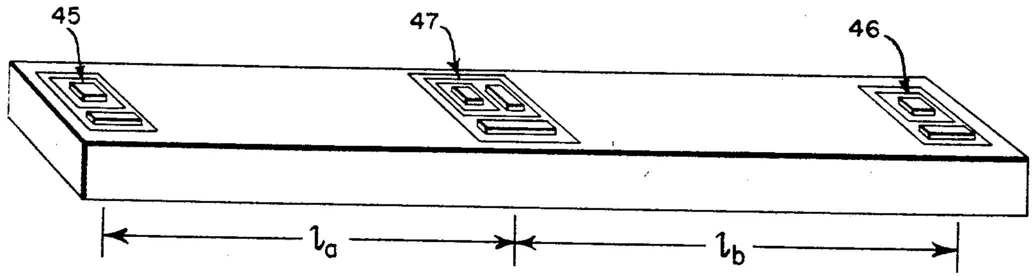
FIGURE 8(*a*) is a pictorial representation of another embodiment of the invention.
Figure 8B:
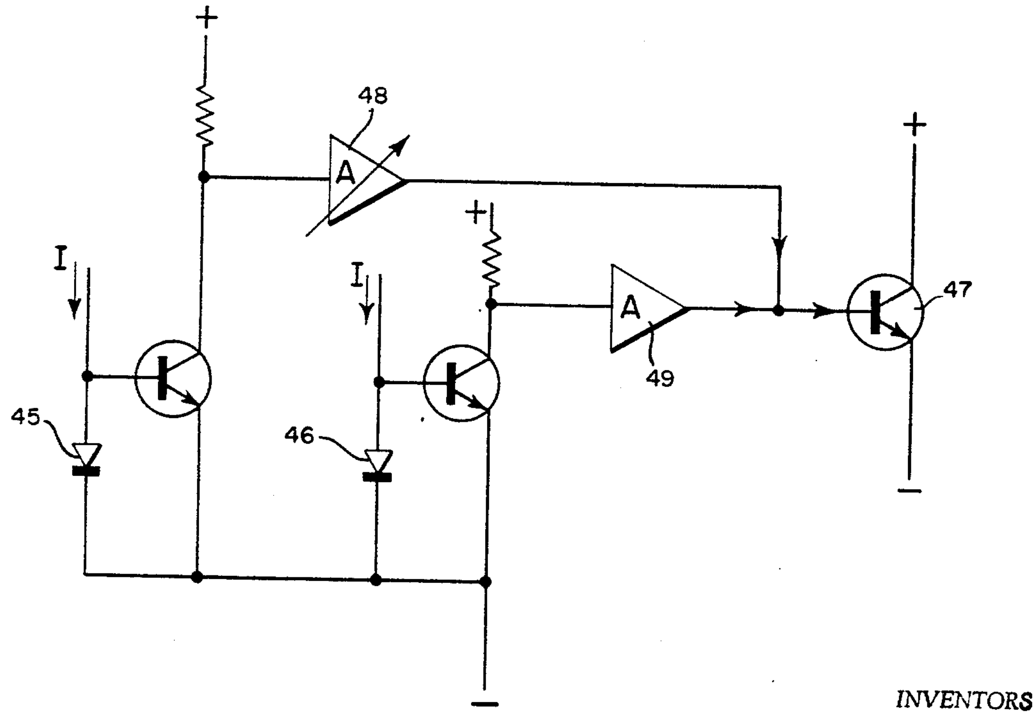

A variable frequency oscillator may be provided by using two diode sensors 45 and 46 in a semiconductor bar spaced different distances $l_a$ and $l_b$ from a heat source 47 as seen in FIGURE 8($a$). The diodes are each connected in the input of a transistor, and each output coupled into a separate one of a pair of amplifiers 48 and 49 as in FIGURE 8($b$). The amplifier outputs are added together and applied to the heater transistor 47. Varying the gain of one amplifier would vary the phase of the signal fed back to the source, thus varying the frequency. In a similar manner, two sources with adjustable outputs coupled to a single sensor provides a variable frequency oscillator.

The embodiment of FIGURE 1 is of a bar type configuration, but obviously an equivalent circular geometry. For example, it can be seen that such a circular geometry can be generated by in effect rotating the device of FIGURE 1 about its left hand end, particularly about the emitter contact 18, so that a semiconductor disc is formed with the sensor transistor at its center, a ring-shaped heat sink around the outer periphery, and the heater transistor in a ring configuration radially spaced from the sensor.

Although the invention has been described with reference to particular embodiments, it is of course understood that modifications of the disclosed embodiments, as well as other embodiments of the invention, will be apparent from this description to persons skilled in the art. It is therefore contemplated that the appended claims will cover any such modifications or embodiments as fall within the true scope of the invention.

What is claimed is:

1. A thermally conductive thermal coupling element comprising a semiconductor body, a temperature responsive means in a heat conducting relationship with said body at a first position, said temperature responsive means component being sensitive to temperature variations at said first position and producing electrical signals in response thereto, a heat sink engaging said body only at a second position, and a variable heat source means engaging said body in a heat conducting relationship at a third position intermediate said first and second position, said temperature responsive means and said variable heat source means electrically isolated one from the other.

2. An electronic element comprising a thermally conductive semiconductive body, a temperature responsive means in a heat conducting relationship with said body at a first position, said temperature responsive means being sensitive to temperature variations at said first position and producing electrical signals in response thereto, a heat sink engaging said body only at a second position spaced from said first position, and a variable heat source means engaging said body in a heat conducting relationship at a third position intermediate to the first and second positions, said heat source means applying heat to said body in response to an electrical current which has a component of a given frequency, said temperature responsive means and said variable heat source means electrically isolated one from the other and the spacing between the first and third positions and between the second and third positions being greater than about one quarter wave length for thermal wave of said given frequency propagating through the body.

3. A thermally conductive thermal coupling element comprising a semiconductor body, a temperature responsive means in a heat conducting relationship with said body at a first position, said temperature responsive means being sensitive to heat variations at said first position and producing electrical signals in response thereto, a heat sink engaging said body only at a second position, and a variable heat source means engaging the body in a heat conducting relationship at a third position intermediate to said first and second position, said variable heat source means generating heat to said body in response to an electrical current which includes a component of a given frequency, said temperature responsive means and said variable heat source means being electrically isolated from each other and spaced along said semiconductor body by distance providing a phase shift of 180° between said component of the electrical current and said electrical signals, the said second and third positions being spaced apart along the body by distance greater than about one quarter wave length for a thermal wave of said given frequency propagating along the body.

References Cited

UNITED STATES PATENTS

| | | | |
|---|---|---|---|
| 2,938,130 | 5/1960 | Noll | 307—88.5 |
| 3,050,638 | 8/1962 | Evans et al. | 307—88.5 |
| 3,258,606 | 6/1966 | Meadows | 307—88.5 |
| 3,308,271 | 3/1967 | Hilbiber | 219—501 |

JOHN W. HUCKERT, *Primary Examiner.*

J. SHEWMAKER, *Assistant Examiner.*